United States Patent [19]
Yang

[11] Patent Number: 6,160,941
[45] Date of Patent: Dec. 12, 2000

[54] METHOD OF MANUFACTURING A MULTI-RIBBON OPTICAL FIBER STRUCTURE THAT CAN BE SEPARATED INTO AT LEAST TWO OPTICAL FIBER RIBBONS

[75] Inventor: Michael Yang, Conover, N.C.

[73] Assignee: Alcatel, Paris, France

[21] Appl. No.: 09/271,256

[22] Filed: Mar. 17, 1999

[30] Foreign Application Priority Data

Mar. 19, 1998 [FR] France ................................. 98 03353

[51] Int. Cl.$^7$ ....................................................... G02B 6/44
[52] U.S. Cl. ............................. 385/114; 385/106; 385/112
[58] Field of Search ................................. 385/114, 106, 385/112, 147

[56] References Cited

U.S. PATENT DOCUMENTS

| 5,442,722 | 8/1995 | DeCarlo . |
| 5,717,805 | 2/1998 | Stulpin ..................................... 385/114 |
| 5,987,204 | 11/1999 | Lee ......................................... 385/100 |

FOREIGN PATENT DOCUMENTS

| 0 647 866 A1 | 4/1995 | European Pat. Off. . |
| 0 813 084 A1 | 12/1997 | European Pat. Off. . |
| 0 843 187 A1 | 5/1998 | European Pat. Off. . |
| 1-137208 | 5/1989 | Japan . |
| 1-138516 | 5/1989 | Japan . |
| 1-138517 | 5/1989 | Japan . |
| 1-138518 | 5/1989 | Japan . |
| 1-139519 | 5/1989 | Japan . |
| 04033510 | 2/1992 | Japan . |

*Primary Examiner*—Cassandra Spyrou
*Assistant Examiner*—Leo Boutsikaris
*Attorney, Agent, or Firm*—Sughrue, Mion, Zinn Macpeak & Seas, PLLC

[57] ABSTRACT

A method of manufacturing a multi-ribbon optical fiber structure which contains optical fibers, and which can be separated into at least two optical fiber ribbons, said method including:

a first step in which a multi-ribbon structure is formed, containing the optical fibers disposed side-by-side, mutually parallel, substantially in the same plane which defines the faces of the multi-ribbon structure, and embedded in a common matrix, by coating the fibers making up the multi-ribbon structure with at least one covering layer, and then by thermosetting the layer; and a second step in which at least one longitudinal score line is formed between two adjacent optical fibers, the score line comprising at least one score in the covering layer, extending parallel to the axis X of the optical fibers of the multi-ribbon structure, and situated in a plane that is perpendicular to the faces of the multi-ribbon structure, and that lies substantially midway between said adjacent optical fibers, the score line being formed by scoring apparatus for scoring at least one of the faces of the multi-ribbon structure.

12 Claims, 3 Drawing Sheets

METHOD OF MANUFACTURING A MULTI-RIBBON OPTICAL FIBER STRUCTURE THAT CAN BE SEPARATED INTO AT LEAST TWO OPTICAL FIBER RIBBONS

The present invention relates to a method of manufacturing a multi-ribbon optical fiber structure that can be separated into at least two optical fiber ribbons, and also relates to multi-ribbon structures obtained by implementing the method.

BACKGROUND OF THE INVENTION

As is known, an optical fiber is designed to convey light waves, and comprises an optical portion or "bare optical fiber", made up of an optical core surrounded by optical cladding, generally covered with at least one protective layer, and optionally with an identification layer which is usually colored. Advantageously, such optical fibers can be grouped together into optical fiber ribbons, in which case the optical fibers are disposed side-by-side, parallel to one another and substantially in the same plane, and they are embedded in a common protective matrix. Such an optical fiber ribbon is generally used for manufacturing a high-density optical cable, e.g. a telecommunications cable, for conveying information from an information provider to a user situated at a point remote from the provider. At the various users, the optical fibers are distributed in various bundles of optical fibers, which means that it is necessary to separate them without damaging them, i.e. without degrading the transmission characteristics of the optical fibers. That is why it is advantageous to use a multi-ribbon optical fiber structure having two substantially flat faces and containing mutually-parallel optical fibers disposed side-by-side substantially in the same plane which then defines the two substantially flat faces of said multi-ribbon structure, and embedded in a common protective matrix, said multi-ribbon structure being separable into at least two optical fiber ribbons.

When using a multi-ribbon optical fiber structure, it would be unnecessarily costly to require additional equipment in situ for separating the multi-ribbon structure into at least two optical fiber ribbons. That is why multi-ribbon structures have been proposed in which scores are provided along at least one longitudinal score line so that they can be subsequently split up into ribbons along the score lines, the scores being formed on coating the optical fibers with at least one matrix-forming covering layer of resin, by molding the resin and then thermosetting it. Thus, U.S. Pat. No. 5,442,722 mentions a first piece of prior art in which scoring is obtained directly by molding the matrix in a manner such as to form a "necked-down" area in it (see FIG. 1 of that patent, showing the prior art in question). That method does not make it possible to obtain ribbons having dimensions that are sufficiently accurate. U.S. Pat. No. 5,442,772 itself relates to technology for opening up the ribbon by means of one or more "zip cords" or "ripcords" inserted in the matrix. Thermosetting is achieved by irradiation, e.g. by curing or "crosslinking" a resin under the effect of ultraviolet (U.V.) radiation, the resin being, for example, based on urethane acrylate. The ultraviolet radiation serves to provide the energy necessary for the curing reaction. Similarly, Patent Application EP-A1-0 647 866 describes a technology based on opening up the ribbon by means of at least one ripcord inserted in a matrix, opening optionally being facilitated by forming scores in the ribbon.

Unfortunately, such technologies have, in practice, been disappointing. Firstly, it is difficult to position the molding apparatus on the multi-ribbon optical fiber structure with accuracy that is high enough to prevent the optical fibers from being damaged. Secondly, a score formed by molding in resin that is still fluid tends to fill with resin soon after molding, especially when the optical fibers advance at high speeds through the apparatus for manufacturing the multi-ribbon structure. Finally, inserted ripcord technology is complicated to implement because the ripcord must be positioned very accurately in the resin matrix, and above all, that technology does not make it possible to separate a multi-ribbon structure elsewhere than at its ends, because it is not possible to access the ripcord except at the ends of the multi-ribbon structure.

Consideration has also been given to scoring the covering as described in the second piece of prior art mentioned in U.S. Pat. No. 5,442,772. Thus, Japanese Patent Application JP-A-1 138 516 proposes a method of manufacturing a multi-ribbon optical fiber structure that has two substantially flat faces, and that can be separated into at least two optical fiber ribbons. That method involves manufacturing two initial ribbons, then partially pre-thermosetting portions of the two initial ribbons, the portions being pre-thermoset together to form the optionally necked-down central portion of the multi-ribbon structure, and being designed to be separated subsequently, and finally fully thermosetting the assembly comprising the two adjoining ribbons so as to form the final multi-ribbon structure, followed by scoring one of the two faces of the multi-ribbon structure with intermittent scoring apparatus including scoring means of the mechanical type (cutting disk with associated backing disk) or of the laser type (laser beam emitter), the scoring being performed in the central portion of the multi-ribbon structure so as to form discontinuous scores spaced apart at a fixed and preferably constant pitch (in the form of "dashes").

The problem that arises in Japanese Patent Application JP-A-1 138 516 is that of manufacturing a multi-ribbon structure such that the two initial ribbons making it up are accurately aligned. The two initial ribbons might slip relative to each other while the resin serving to form the matrix of the multi-ribbon structure is still fluid, i.e. not cured or partially cured only, or while it is solid, i.e. almost totally cured. Such slippage, even if it is only slight, is highly detrimental to the resulting multi-ribbon structure, and is difficult to control when manufacturing industrially. This applies even more so when the optical fibers advance at high speeds through the apparatus for manufacturing the multi-ribbon structure. Furthermore, the scoring apparatus such as it is implemented in said patent application requires the two optical fibers in the central portion of the multi-ribbon structure, where the intermittent scoring takes place, to be spaced apart by a distance greater than the distance between adjacent optical fibers in the ribbons. Thus, the spacing between two adjacent optical fibers making up the multi-ribbon structure must be constant except between the two optical fibers side-by-side in the central portion of the multi-ribbon structure, between which fibers the spacing must be greater.

OBJECTS AND SUMMARY OF THE INVENTION

The method of the invent-on proposes to solve the above-mentioned problems in that it manufactures a multi-ribbon structure containing optical fibers that are mutually parallel, that are side-by-side, and that lie in substantially the same plane, which multi-ribbon structure is easy to separate into at least two optical fiber ribbons without degrading the transmission characteristics of the optical fibers.

The present invention provides a method of manufacturing a multi-ribbon optical fiber structure which contains optical fibers, which has two substantially flat faces, and which can be separated into at least two optical fiber ribbons, said method comprising the following two successive steps:

a first step in which a multi-ribbon structure is formed from a plurality of optical fibers, each of which comprises an optical core, optical cladding and optionally a protective layer, said multi-ribbon structure containing said optical fibers disposed side-by-side, mutually parallel, substantially in the same plane which then defines two substantially flat faces of said multi-ribbon structure, and embedded in a common protective matrix, by coating all of the fibers making up the multi-ribbon structure with at least one matrix-forming covering layer of thermosettable resin, and then by thermosetting said layer; and a second step in which at least one longitudinal score line is formed between two adjacent optical fibers, the score line comprising at least one preferably continuous score in the covering layer, extending parallel to the axis X of the optical fibers of the multi-ribbon structure, and situated in a plane that is perpendicular to the faces of the multi-ribbon structure and parallel to the axis X, and that lies substantially midway between said adjacent optical fibers, the score line being formed by scoring apparatus including scoring means for scoring at least one and preferably both of the faces of the multi-ribbon structure;

the multi-ribbon structure being designed to be subsequently separated almost exclusively along the score line formed in this way by scoring.

Preferably, two longitudinal score lines are formed facing each other in the plane $P_0$.

The method of the invention offers the advantage of making the multi-ribbon optical fiber structure obtained using said method very practical to use in situ. Said multi-ribbon structure can be separated into at least two optical fiber ribbons manually, without using any additional, more costly, and more complicated separation equipment. Another advantage is that the separation can be performed anywhere along the multi-ribbon structure, either at its ends or elsewhere. An additional advantage of the multi-ribbon optical fiber structure obtained by using the method of the invention is that the method of the invention is sufficient in itself to achieve subsequent separation, i.e. the multi-ribbon structure is separated almost exclusively along the score line formed by scoring, without requiring any other means, such as a ripcord inserted in the matrix.

The method of the invention also offers the advantage of making it possible to manufacture multi-ribbon structures having uniform spacing, i.e. in which all of the adjacent optical fibers in the multi-ribbon structure are uniformly spaced apart therein. Such multi-ribbon structures having uniform spacing offer the advantage of often being more compatible with other multi-ribbon structures manufactured differently.

BRIEF DESCRIPTION OF THE DRAWINGS

The invention will be better understood and other characteristics and advantages will appear on reading the following description given by way of non-limiting example and with reference to FIGS. 1 to 5, in which.

MORE DETAILED DESCRIPTION

Figure 1:
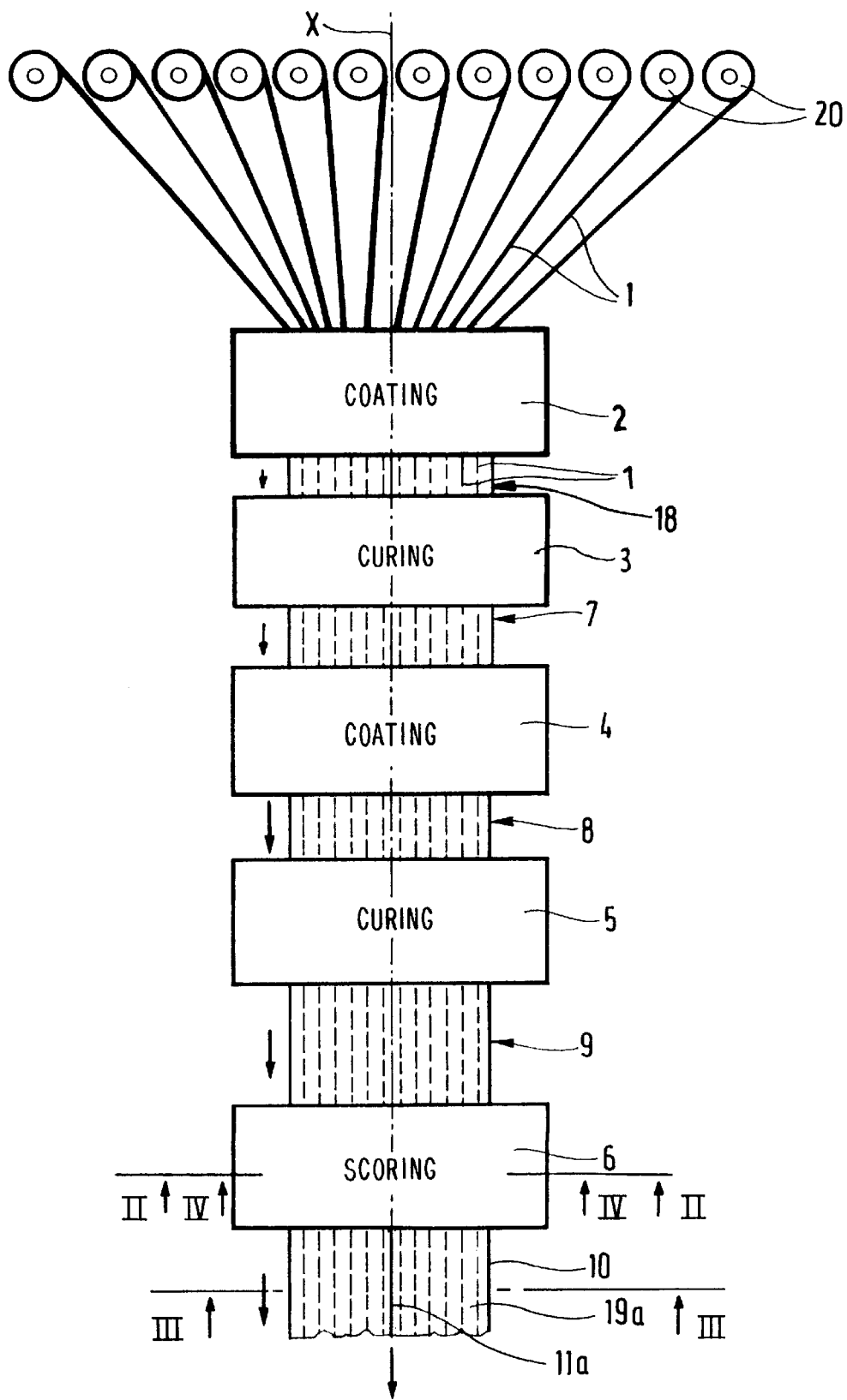
FIG. 1 is a diagrammatic view of the method of manufacturing a multi-ribbon optical fiber structure of the invention that can be separated into two optical fiber ribbons.

FIG. 1 is a diagrammatic view showing the method of the invention for manufacturing a multi-ribbon structure 10 having two substantially flat faces 19a and 19b, containing twelve optical fibers 1, provided with two continuous scores 11a and 11b extending over respective ones of its two faces 19a and 19b (only face 19a and score 11a are visible in FIG. 1), and separable into two optical fiber ribbons, each of which contains six fibers. Each optical fiber 1 is paid out from respective optical fiber paying-out means 20, and the twelve optical fibers are brought together in the apparatus 2 for coating them with a covering layer 15 (see FIG. 2) of resin that can be thermoset by U.V. curing. The resulting multi-ribbon structure 18 is made up of optical fibers 1 which are disposed side-by-side, which are mutually parallel, which are substantially in the same plane that then defines the two substantially flat faces 19a and 19b of said multi-ribbon structure, and which are embedded in the covering layer 15. At this stage of manufacturing, the resin is still relatively fluid. The apparatus 2 also makes it possible to align the fibers before they are coated.

The direction of advance in which the optical fibers advance through the apparatus shown in FIG. 1 is indicated by the arrows, and by an axis X. The axis X, which is the axis of the optical fibers in the multi-ribbon structure, i.e. which is parallel to the longitudinal axis of each optical fiber in the multi-ribbon structure, is generally a downwardly-extending vertical axis.

The multi-ribbon structure 18 is then directed towards curing thermosetting apparatus 3 which includes a U.V. source so as to obtain a multi-ribbon structure 7 which is at least partially set by U.V. curing. In a variant, the apparatus 3 includes at least two U.V. sources.

The resulting multi-ribbon structure 7 is directed towards coating apparatus 4 for coating it with a covering layer 16 (see FIG. 2) of resin to obtain a multi-ribbon structure 8, the resin being thermosettable by U.V. curing.

The resulting multi-ribbon structure 8 is directed towards curing thermosetting apparatus 5 which includes a U.V. source so as to obtain a multi-ribbon structure 9 that is almost totally set by U.V. curing. In a variant, the apparatus 5 includes at least two U.V. sources.

Thus, each time the multi-ribbon structure is coated with a covering layer, the resin of said layer is at least partially thermoset before being coated with another covering layer. Thus, the "wet-on-dry" method is used.

The U.V. curing sources used in the method of the invention are sources known to the person skilled in the art, such as ultraviolet light sources, such as high-pressure mercury vapor lamps, special fluorescent tubes or special metal halide lamps, or else single wavelength excimer lamps.

Figure 2:
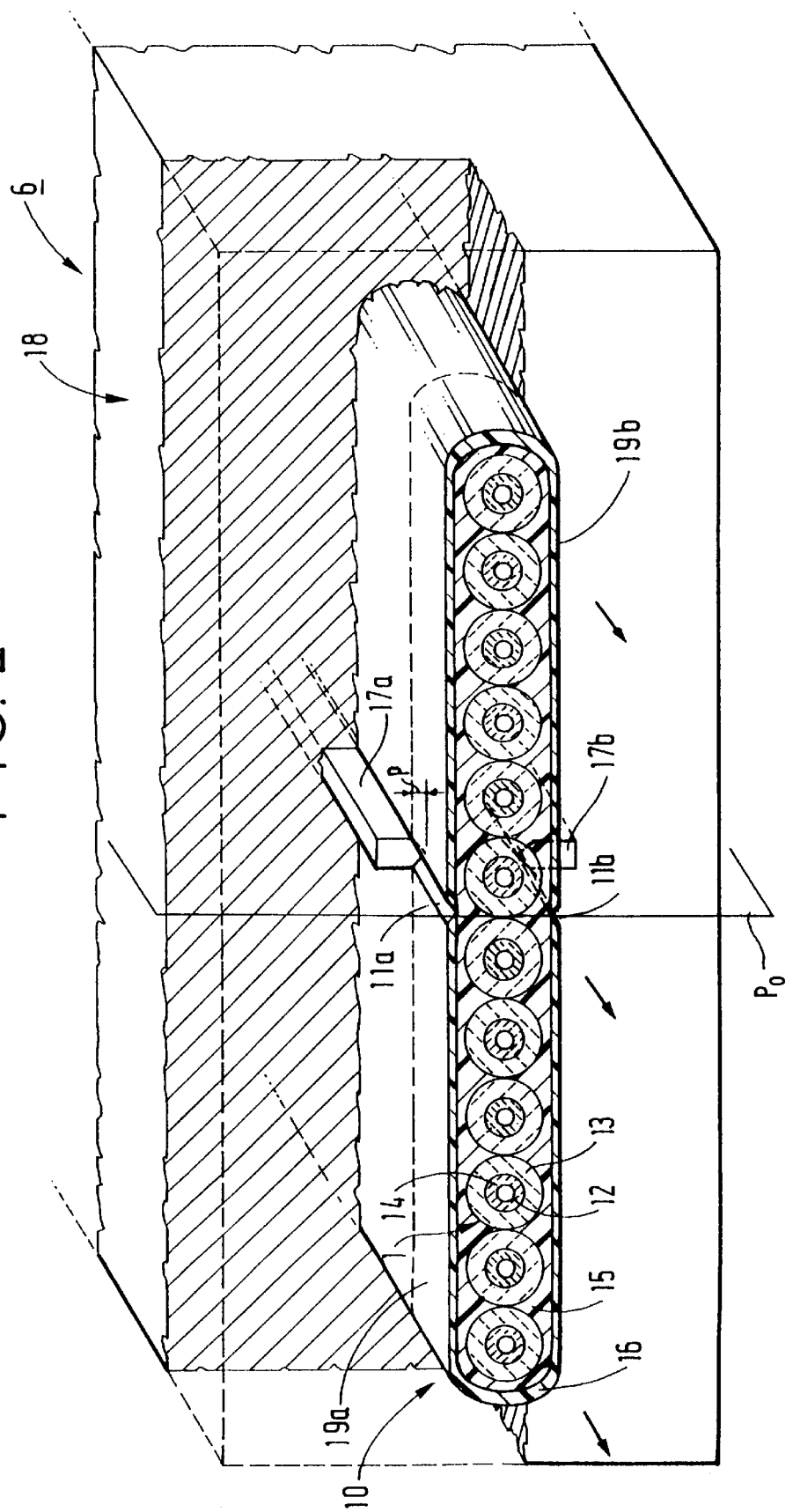
FIG. 2 is a diagrammatic perspective view cut-away from cross-section II—II (see FIG. 1), showing a multi-ribbon optical fiber structure obtained by implementing the method of the invention, and showing the scoring means for scoring the multi-ribbon structure inside the scoring apparatus.

The multi-ribbon structure 9 is then directed towards scoring apparatus 6 so as to obtain a scored multi-ribbon structure 10 provided with two scores 11a and 11b that are shallow, longitudinal, and continuous, i.e. that extend over the entire length of the multi-ribbon structure 10, on respective ones of the two faces 19a and 19b of the multi-ribbon structure 10 (see FIG. 2).

In a variant, it is possible for the optical fibers not to be uniformly spaced apart, and for the spacing between two adjacent optical fibers to be greater where the scoring apparatus 6 forms at least one score line. In which case, the spacing between two optical fibers is constant, e.g. substantially equal to zero, except for the spacing between said adjacent optical fibers. In another variant, it is also possible for the scoring apparatus to form scores that are discontinuous along the score lines, i.e. scores that are spaced apart, preferably uniformly, so as to be interrupted, with a preferably constant given scoring pitch.

Thus, the scoring apparatus 6 forms two score lines facing each other, as explained below. This advantageous implementation makes it easier, when in situ, for the multi-ribbon optical fiber structure obtained using the method of the invention to be separated into two optical fiber ribbons, in particular when the scores are discontinuous, but also when they are continuous.

In an implementation of the apparatus of the invention that is different from the implementation described with reference to FIG. 1 which shows a wet-on-dry method, and when the multi-ribbon structure is coated with at least two covering layers and they are thermoset prior to being scored, the "wet-on-wet" method is used for applying the Layers of resin forming the matrix of the multi-ribbon structure and for thermosetting them. The wet-on-wet method consists in coating the multi-ribbon structure with the covering layers and then in thermosetting all of said layers together. Thus, at least partial thermosetting is not performed between each coating with a covering layer.

In another implementation, only one covering layer is applied, and then thermoset, before scoring is performed.

FIG. 2 is a diagrammatic perspective view cut-away from the cross-section II—II (see FIG. 1), showing a scored multi-ribbon structure 10 containing twelve optical fibers 1 and obtained using the method of the invention as shown in FIG. 1. Each optical fiber 1 comprises an optical core 14, optical cladding 12, and a protective layer 13. The multi-ribbon structure 9 includes a matrix-forming double protective layer (15, 16). Said multi-ribbon structure is scored by means of the scoring apparatus 6 so as to be provided with continuous scores 11a and 11b. Cutting blades 17a and 17b can be seen scoring the multi-ribbon structure 9 over respective ones of its two faces 19a and 19b, thereby forming the multi-ribbon structure 10 provided with respective continuous scores 11a and 11b, in equipment situated inside the box 18, such equipment comprising, inter alia, means for holding the blades 17a and 17b and other equipment useful to operating the scoring apparatus 6. The two scores 11a and 11b are formed in the plane $P_0$ defined as being a plane perpendicular to the faces of the multi-ribbon structure and parallel to the axis X, substantially midway between the two optical fibers situated in the center of the multi-ribbon structure. The plane $P_0$ thus defined contains the scores 11a and 11b. Therefore, the scores 11a and 11b face each other in the plane $P_0$.

The two cutting blades 17a and 17b are of scoring thickness p for scoring the multi-ribbon structure 9 that is constant over their entire length, i.e. the scoring means cause a score (11a, 11b) that is continuous and of constant depth to be formed over at least one face of the multi-ribbon structure, scores being formed in both faces 19a and 19b in the case shown in FIG. 2. In FIG. 2, by means of the scores 11a and 11b, the scoring means (17a, 17b) form two longitudinal score lines facing each other about the multi-ribbon structure, thereby making it easier for the multi-ribbon structure 10 to be separated into two ribbons in situ. Another variant of the invention consists in providing gradual cutting blades, i.e. in which the cutting depth of the cutting blade increases so that, at the end of the stroke, it has the required depth p, thereby cutting increasingly deeply into the material of the multi-ribbon structure 9 as said multi-ribbon structure advances (in the direction of advance along the axis X) inside the scoring apparatus 6. Thus, when there are two cutting blades, a scored multi-ribbon structure is obtained that is provided with two scores of constant depth p. This variant offers the advantage of reducing the friction between the multi-ribbon structure and the blades 17a and 17b, which is particularly advantageous when the speed at which the optical fibers advance through the apparatus for manufacturing the multi-ribbon structure is high.

In an implementation, the multi-ribbon structure 10 is obtained by scoring by means of an industrial excimer laser, and the depth of the score is 15 $\mu$m for a ribbon of dimensions substantially equal to 3.05 mm×345 $\mu$m, with the diameter of each of the optical fibers being equal to 245 $\mu$m. In general, in the invention, a depth of at least 10 $\mu$m and preferably lying in the range 15 $\mu$m to 50 $\mu$m is desirable. More generally, in the invention, and in any plane perpendicular to the axis X, it is desirable for the ratio between the depth of the score and the total thickness of the ribbon to be not more than 10%, and preferably not more than 5%. In the above example, this ratio is equal to 4.35%.

Figure 3:
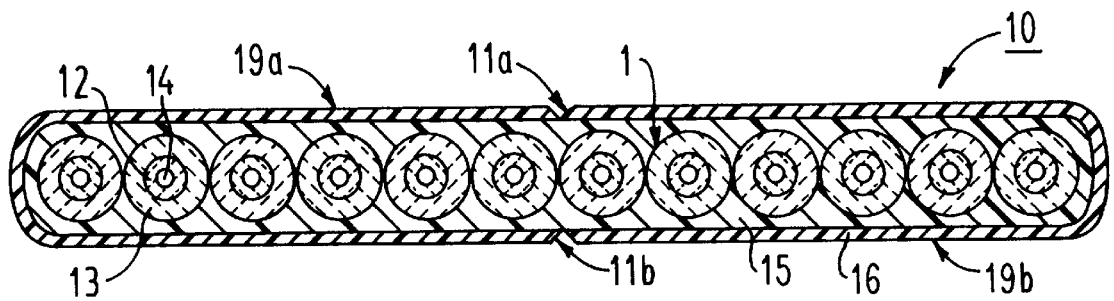
FIG. 3 is a diagrammatic view in cross-section on III—III (see FIG. 1) showing a multi-ribbon optical fiber structure obtained by implementing the method of the invention.

FIG. 3 is a diagrammatic view in cross section on III—III (see FIG. 1) showing the multi-ribbon structure 10. Each optical fiber 1 comprises an optical core 14, optical cladding 12, and a protective layer 13. The core/cladding relative dimensions of each optical fiber may take any proportion known to the person skilled in the art. The multi-ribbon structure 10 comprises twelve optical fibers 1 spaced apart uniformly inside the multi-ribbon structure 10, and a double protective layer (15, 16) forming the matrix of said multi-ribbon structure. Said multi-ribbon structure is scored by the scoring apparatus 6 so that it is provided with continuous scores 11a and 11b.

Figure 4:
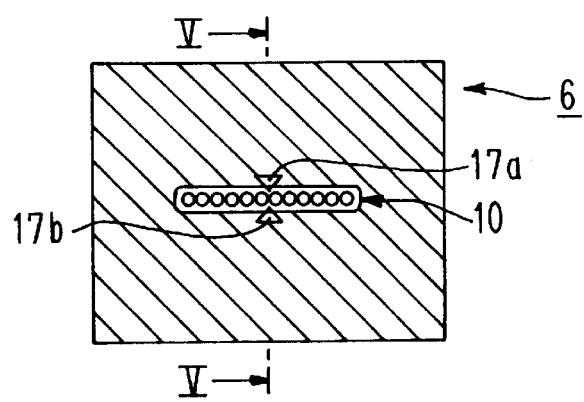
FIG. 4 is a diagrammatic view in cross-section on IV—IV (see FIG. 1), showing the scoring apparatus.

FIG. 4 is a diagrammatic view in cross-section on IV—IV (see FIG. 1), showing the scoring apparatus 6 as shown in FIG. 1. Such apparatus is of the mechanical type, but it is also possible, in the context of the present invention, to use scoring apparatus of the laser beam type. Such laser-type scoring apparatus is generally constituted by an industrial cutting laser such as an excimer laser. FIG. 4 shows the two cutting blades 17a and 17b forming the scoring means for scoring the multi-ribbon structure 10 over respective ones of its two faces 19a and 19b with respective continuous scores 11a and 11b in equipment (not shown) situated inside the box 18.

In a variant of the method of the invention, the scoring apparatus is preferably associated with aligning apparatus (not shown) for aligning the multi-ribbon structure relative to the scoring means, so as to position the scoring as accurately as possible. Similarly, it is possible and preferable in another variant of the method of the invention to associate the scoring apparatus with cleaning apparatus (not shown) for cleaning the scoring means formed of cutting blades 17a and 17b, mainly so as to keep the cutting blades 17a, 17b relatively clean, which is necessary for the apparatus to be effective, particularly at high speeds of advance. Such apparatus may also advantageously make it possible to form a scored multi-ribbon structure that is substantially free of residual impurities such as impurities in the form of small particles of thermoset resin. For example, such cleaning apparatus may be apparatus for injecting a flow of air in the direction of advance along the axis X or in the opposite direction therealong, i.e. downwards or upwards, along the ribbon being scored. It is also possible to use a brush or any other mechanical means. Or else such cleaning apparatus may, for example, be ultrasound apparatus injecting a flow of cleaning liquid along the ribbon being scored, while generating ultrasound which helps to cause the impurities to pass into the flow of liquid. In such a case, the liquid preferably flows around a closed loop and cleaning apparatus for cleaning said liquid is preferably disposed in said loop.

Figure 5:
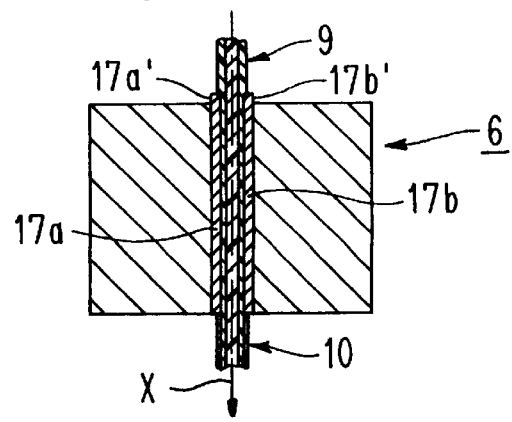
FIG. 5 is a diagrammatic view in cross section on V—V (see FIG. 4), showing the scoring apparatus.

FIG. 5 is a diagrammatic view in cross-section on V—V (see FIG. 4), showing the scoring apparatus 6. As shown, the cutting blades 17a and 17b are provided with respective projections 17a' and 17b', i.e. the scoring apparatus 6 includes apparatus that is constituted, in this example, by two projections 17a' and 17b', for inserting the multi-ribbon structure 9 into it, enabling the multi-ribbon structure to be gripped better on being inserted into the scoring apparatus 6, in particular when the optical fibers advance at high speeds through the apparatus for manufacturing the multi-ribbon structure 10.

Naturally, the method of the invention is not limited to the examples shown and described above. In particular, the multi-ribbon structure obtained by implementing the method of the invention may be a multi-ribbon structure containing eight or twenty-four optical fibers, it then being separable respectively into two ribbons of four optical fibers, or into four ribbons of six optical fibers or two ribbons of twelve optical fibers.

What is claimed is:

1. A method of manufacturing a multi-ribbon optical fiber structure which contains optical fibers, which has two substantially flat faces, and which can be separated into at least two optical fiber ribbons, said method comprising the steps of:

forming a multi-ribbon structure from a plurality of optical fibers, each of which comprises an optical core, optical cladding and optionally a protective layer, said multi-ribbon structure containing said optical fibers disposed side-by-side, mutually parallel, substantially in the same plane which then defines two substantially flat faces of said multi-ribbon structure, and embedded in a common protective matrix, by coating all of the fibers making up the multi-ribbon structure with at least one matrix-forming covering layer of thermosettable resin, and then by thermosetting said layer; and forming at least one longitudinal score line between two adjacent optical fibers, the score line comprising at least one score in the covering layer, extending parallel to the axis X of the optical fibers of the multi-ribbon structure, and situated in a plane that is perpendicular to the faces of the multi-ribbon structure and parallel to the axis X, and that lies substantially midway between said adjacent optical fibers, the score line being formed by scoring apparatus for scoring at least one of the faces of the multi-ribbon structure;

the multi-ribbon structure being designed to be subsequently separated almost exclusively along the score line formed in this way by scoring.

2. A method according to claim 1, wherein said thermosetting comprises curing under the effect of ultra-violet radiation.

3. A method according to claim 1, wherein said forming step comprises scoring both faces of the multi-ribbon structure so that the score lines face each other in the plane.

4. A method according to claim 1, such that the optical fibers in the multi-ribbon structure are spaced apart uniformly inside the multi-ribbon structure.

5. A method according to claim 1, wherein said forming step comprises forming a continuous score on at least one face of the multi-ribbon structure along the score line.

6. A method according to claim 1, such that, in any plane perpendicular to the axis X, the ratio between the depth of the score and the total thickness of the ribbon is not more than 10%.

7. A method according to claim 1, such that, in any plane perpendicular to the axis X, the ratio between the depth of the score and the total thickness of the ribbon is not more than 5%.

8. A method according to claim 1, such that the scoring apparatus is associated with alignment apparatus for aligning the multi-ribbon structure relative to the scoring means.

9. A method according to claim 1, such that the scoring apparatus are of the laser beam type.

10. A method according to claim 1, such that the scoring apparatus are of the mechanical type.

11. A method according to claim 10, further comprising cleaning apparatus for cleaning the scoring apparatus.

12. A method according to claim 10, such that the scoring apparatus includes apparatus for inserting the multi-ribbon structure into it.

* * * * *